(12) United States Patent
Walser et al.

(10) Patent No.: US 11,396,204 B2
(45) Date of Patent: Jul. 26, 2022

(54) FLEXIBLE HUBCAP FOR A VEHICLE WHEEL HAVING A FLOATING SEAT

(71) Applicants: COMPAGNIE GENERALE DES ETABLISSEMENTS MICHELIN, Clermont-Ferrand (FR); MAXION WHEELS U.S.A. LLC, Novi, MI (US)

(72) Inventors: Daniel Walser, Clermont-Ferrand (FR); Benjamin Edward Ebel, Clermont-Ferrand (FR); Ralf Duning, Solingen (DE); Johan Vits, Boechout (BE)

(73) Assignees: COMPAGNIE GENERALE DES ETABLISSEMENTS MICHELIN, Clermont-Ferrand (FR); MAXION WHEELS U.S.A. LLC, Novi, MI (US)

( * ) Notice: Subject to any disclaimer, the term of this patent is extended or adjusted under 35 U.S.C. 154(b) by 325 days.

(21) Appl. No.: 16/316,206

(22) PCT Filed: Jul. 4, 2017

(86) PCT No.: PCT/FR2017/051816
§ 371 (c)(1),
(2) Date: Jan. 8, 2019

(87) PCT Pub. No.: WO2018/007750
PCT Pub. Date: Jan. 11, 2018

(65) Prior Publication Data
US 2021/0283947 A1    Sep. 16, 2021

(30) Foreign Application Priority Data
Jul. 8, 2016    (FR) .................................... 1656593

(51) Int. Cl.
*B60B 7/06*    (2006.01)
*B60B 7/04*    (2006.01)
(Continued)

(52) U.S. Cl.
CPC ............ *B60B 7/063* (2013.01); *B60B 7/04* (2013.01); *B60B 7/065* (2013.01); *B60B 7/08* (2013.01); *B60B 7/14* (2013.01)

(58) Field of Classification Search
CPC .......... B60B 7/063; B60B 7/18; B60B 7/065; B60B 7/04; B60B 7/08; B60B 7/14
See application file for complete search history.

(56) References Cited

U.S. PATENT DOCUMENTS

| 4,268,090 A | * | 5/1981 | Rush ..................... G01M 1/36 |
| | | | 301/37.105 |
| 5,511,857 A | | 4/1996 | Ichikawa et al. |
| | | | (Continued) |

FOREIGN PATENT DOCUMENTS

| DE | 3328519 A1 | 2/1985 |
| DE | 8521828 U1 | 11/1985 |
| | (Continued) | |

OTHER PUBLICATIONS

International Search Report dated Oct. 10, 2017, in corresponding PCT/FR2017/051816 (6 pages).

*Primary Examiner* — Scott A Browne
(74) *Attorney, Agent, or Firm* — Venable LLP

(57) ABSTRACT

A hubcap for a wheel with a floating tire seat, the wheel having a rim comprising a tire seat extended axially outwards by a flange, the tire seat being radially floating, comprises a central edge and an exterior periphery, in which the central edge comprises fixing elements for attaching to the rigid part of the wheel and in which the central edge is connected to the exterior periphery by an intermediate sector that is deformable so that the exterior periphery can be moved at least radially inwards with respect to the central edge.

6 Claims, 8 Drawing Sheets

(51) Int. Cl.
  *B60B 7/08*   (2006.01)
  *B60B 7/14*   (2006.01)

(56) References Cited

U.S. PATENT DOCUMENTS

2009/0066151 A1* 3/2009 Sulahian ................ B60B 7/066
                                                   301/37.34
2016/0311255 A1  10/2016 Ahouanto et al.
2017/0291457 A1  10/2017 Topin et al.

FOREIGN PATENT DOCUMENTS

| DE | 9204216 U1 | 5/1992 |
| DE | 43 01 778 A1 | 7/1994 |
| WO | 00/24595 A1 | 5/2000 |
| WO | 2015/086662 A1 | 6/2015 |
| WO | 2016/046197 A1 | 3/2016 |

* cited by examiner

FLEXIBLE HUBCAP FOR A VEHICLE WHEEL HAVING A FLOATING SEAT

FIELD OF THE INVENTION

The subject of the invention is a hubcap for a vehicle wheel of which the seat intended to accept the tyre bead is radially floating. The invention notably relates to assemblies comprising a flexible adapter inserted between a tyre bead and a rim.

A tyre, a rim, an adapter, as discussed in the present invention, are objects which are usually described by a representation in a meridian plane, namely a plane containing an axis of rotation, the axis of rotation of the tyre. The radial and axial directions respectively denote the directions perpendicular to the axis of rotation of the tyre and parallel to the axis of rotation of the tyre. In what follows, the expressions "radially" and "axially" respectively mean "in a radial direction", and "in the axial direction". The expressions "radially on the inside" or, respectively, "radially on the outside" mean "closer to" or, respectively, "further away from, the axis of rotation of the tyre, in a radial direction". A median plane is a plane perpendicular to the axis of revolution of the tyre, positioned axially in such a way as to intersect the surface of the tread substantially mid-way between the beads. The expressions "axially on the inside or, respectively, axially on the outside" mean "closer to or, respectively, further away from, the median plane of the tyre, in the axial direction".

PRIOR ART

In general, a tyre comprises a tread, intended to come into contact with the ground, two sidewalls extending the axial ends of the tread radially inwards, and two beads extending the two sidewalls radially inwards and intended to come into contact with a rim.

Document WO2016/046197 proposes inserting an elastic adapter between a tyre bead and a rim. The reader may for example refer to FIG. 5 of that document in order to acquaint himself with a rolling assembly belonging to the field of the invention. Therein he will see a rolling assembly comprising a tyre, a rim and two identical adapters. Considering the language conventions recalled hereinabove, and with reference to the way in which such an adapter is mounted on a rim, such an adapter comprises, axially from the inside towards the outside, an axially inner end intended to secure the adapter to the rim. Such an adapter also comprises an axially outer end intended to receive a tyre bead. A flexible body connects the two, respectively axially inner and axially outer, ends. Such a wheel has a floating seat. It comprises a rim of which the axial ends, where the tyre seats are situated, can move essentially radially in the event of a very high stress loading by a force oriented radially towards the axis of rotation of the wheel. To give a concrete example, let it be pointed out that a seat is considered to be "floating" if, when the mounted assembly is compressed on flat ground, the deflection of the wheel is greater than 2.5 mm/T (millimetres per tonne) and preferably greater than 3.2 mm/T.

The benefit of mounting a tyre on a wheel with a floating seat is that it makes the tyre less sensitive to a violent impact such as a knock against a kerb for example. That allows the tyre bead a greater amount of movement associated with the travel permitted by the floating seat. It will be readily appreciated that the greater the travel offered to the tyre, the less sensitive it will be to the impact. And especially when the space able to accommodate this travel is great. The rigid part of the wheel must therefore not impede this travel.

Yet in the industrial field of wheels and wheel trims/hubcaps therefor, most of these objects are rigid and non-flexible. Only the tyre affords the ability to deform so that it, with the vehicle suspension, contributes to absorbing the unevenness of the road. The wheels are completely rigid in the face of the service stress loadings, "completely" meaning that they are rigid as far as the rim flange. When a wheel comprises a wheel trim or hubcap, the latter is also rigid, or in any event experiences no deformations imposed by its use.

Hubcaps, a part of which is flexible because it is designed to collaborate with the tyre, are also known in the prior art. Documents DE 8,521,828 U1, DE 9,204,216 U1, DE 4,301,778 A1 or U.S. Pat. No. 5,511,857, for example, may be consulted.

Coming back to the category of floating-seat wheels, it is necessary for the volume under the end of the rim, under the seat, not to comprise any obstacle that functionally opposes the desired deformations when such a floating-seat wheel is being used. What that means to say is that a functional void needs to be created. Now, this functional void creates a design constraint as the eye is drawn to the metal part of the wheel which contrasts with the adapter and the tyre, which are made of rubber, and therefore black in colour. The consequences of the presence of adapters do not follow the current trend in wheel design. Specifically, the current trend is to have, visually, a wheel which is as large as possible, and sometimes also to have "full face" wheels, which means to say wheels that exhibit no visual break in continuity onto the rim flanges but rather exhibit an almost flat surface between the sidewall of the tyre and the wheel disc.

There then arises the problem of finding a technical means of filling this functional void, at least in terms of visual perception, so as to give the assemblies of tyres mounted on floating-seat wheels a more attractive appearance.

BRIEF DESCRIPTION OF THE INVENTION

The invention relates to a hubcap for a tyre, intended to be used with a wheel that has a floating tyre seat, the said wheel having an axis of rotation, the said wheel comprising a rigid central part comprising a mounting bearing surface and comprising a rigid peripheral part, the said central part being connected to the peripheral part rigidly, the said peripheral part having a rim centre, the rim centre being extended axially by rim lateral parts, each rim lateral part comprising a tyre seat extended axially outwards by a flange, at least one of the tyre seats being radially floating.

The subject of the invention is a hubcap for a tyre, the said hubcap comprising:
  a central edge comprising the fixing elements for securing to the wheel, which are arranged inside a circle of radius $R_1$,
  an exterior periphery inscribed on a circle of radius $R_2$, characterized in that the said central edge and the said exterior periphery are in accordance with at least one of the arrangements selected from among the following two arrangements:
  the exterior periphery is axially distant from the closest of the fixing elements for securing to the wheel by a value exceeding 10% of R2,
  the circle R1 represents at most 90% of R2.

Thus, because of a sufficient distance, either radially, or axially, or radially and axially, there is an intermediate sector, which incidentally is also constructed in such a way that it is deformable in the face of the service stress loadings, the said intermediate sector being positioned between the said exterior periphery and the fixing elements of the said central edge provide the attachment to the rigid part of the wheel, so that the exterior periphery can move at least radially inwards with respect to the central edge. As a result, the hubcap can remain secured to the wheel and accommodate movements of its periphery which collaborates with the radially floating part of the wheel.

The floating-seat wheel, in its rigid part, may be produced in any of the ways that are suitable for a conventional wheel, namely for a wheel that is completely rigid in the face of the service stress loadings, such as, for example, in pressed sheet, light alloy, composite material, or a combination of any of the technologies listed above. The mounting bearing surface allows the wheel to be mounted on a hub directly, or by means of intermediate components (these too being rigid). The bearing surface for attachment to a hub is on the axially interior side of the wheel, the hubcap being mounted on the axially exterior side. In its floating part, the said wheel may for example be produced in the way explained in the aforementioned patent application WO2016/046197.

The invention allows for multiple design variations in the combination of the rigid wheel part and the attached hubcap, which make it possible to create a finished item (floating-seat wheel) the appearance of which is similar to that of rigid wheels, notably light alloy wheels which have become very popular for passenger vehicles.

The fixing elements for securing to the rigid central part of the wheel provide removable attachment, by means of screws for example or any other equivalent fixing means, which means that the hubcap can easily be replaced for example in order to alter the design of the wheel or to make the operation of fitting the adapters (flexible part of the rim) or the tyre easier. Of course, a person skilled in the art may resort to other fixing means, for example using clip fastening, or even rivets, which may likewise be considered to afford removable attachment because they can be drilled out in order to dismantle the components thus assembled. In addition, the fact that the hubcap according to the invention is attached to the wheel gives it a position that is stable, leading to no vibration during running. On the functionally opposite side from the attachment to the wheel, the hub may lie flush with or press against a part of the adapter provided for this purpose and may exhibit a profile and an elasticity which are such that, in the event of an impact against a kerb, the trim can deform and allow the extender bearing the tyre to flex.

DESCRIPTION OF THE FIGURES

The invention is described hereinafter with the aid of FIGS. 1 to 4, among which.

DETAILED DESCRIPTION OF THE INVENTION

Figure 1:
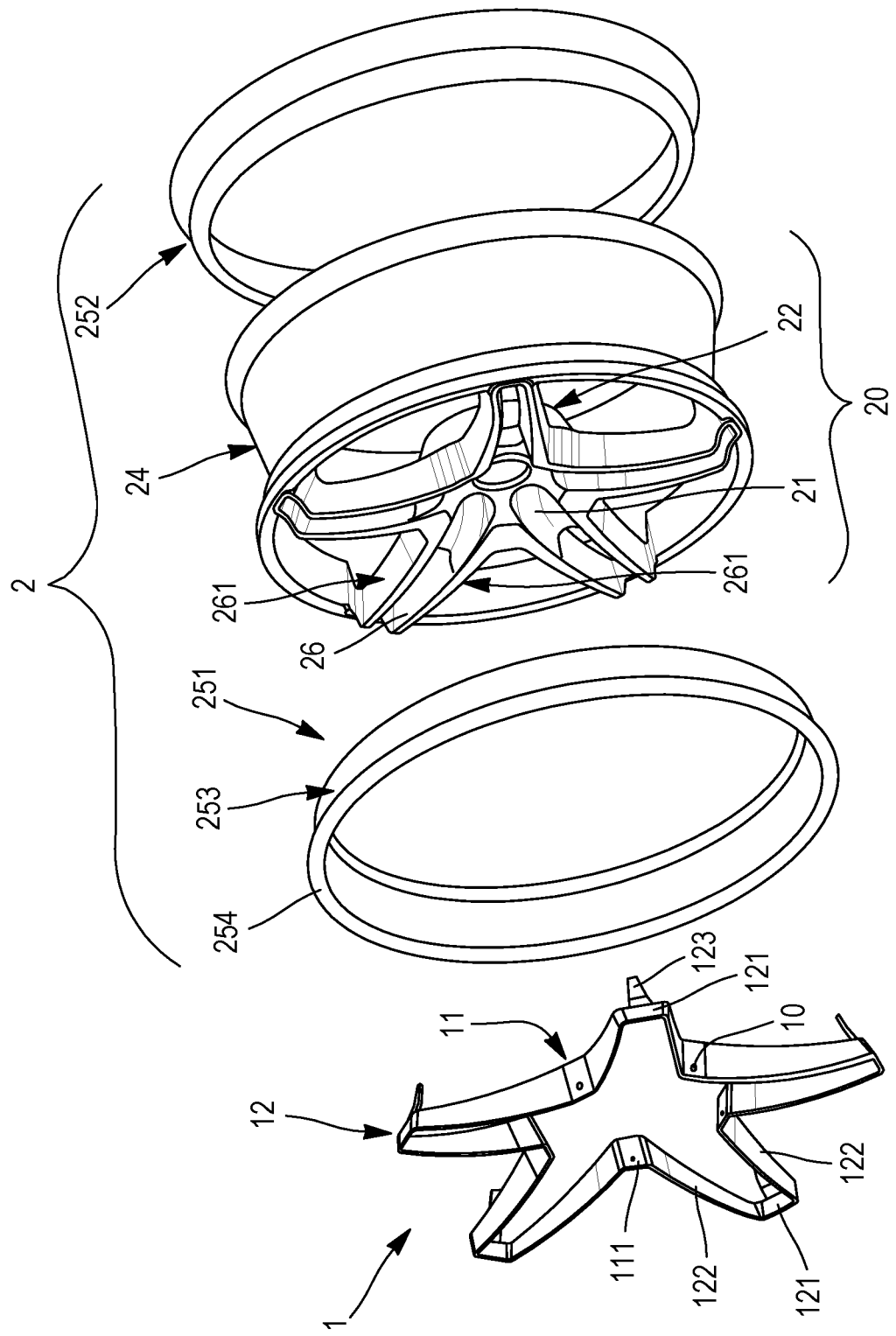
FIG. 1 is a perspective view showing a hubcap according to the invention and a rim and two adapters with which it is used.

FIG. 1 shows a hubcap 1 and a floating-seat wheel 2. The floating-seat wheel 2 is formed by the assembly of a rigid wheel base 20 and two rim lateral parts 251 and 252, both flexible. Each rim lateral part comprises a tyre seat 253 extended axially outwards by a flange 254. In this embodiment, each of the rim lateral parts readopts identical teaching to the adapter in document WO2016/046197; each rim lateral part is made of reinforced elastomer that allows it to move in a radial direction of the flange 254 with respect to the opposite end of the said rim lateral part. The rigid wheel base 20 is a component which is generally a one-piece component, comprising a rigid central part 21 and a rigid peripheral part 23 which are connected rigidly by a plurality of spokes 26; each spoke 26 has two lateral faces 261 which are substantially parallel to one another and substantially parallel to a plane containing the axis of rotation of the wheel. The central part 21 comprises a fixing bearing surface 22 for attaching to a hub, defining an axially interior side of the wheel. The peripheral part 23 has a central zone that forms the rim centre 24.

As an alternative, the floating-seat wheel may also comprise flexible rim lateral parts mounted in various ways, such as, for example, according to one or another of the examples given in document WO2015/086662, in all aspects equivalent as far as the present invention is concerned which is applicable provided that the wheel comprises floating seats, whatever the embodiment of the flexible part of the wheel.

As for the hubcap 1, it may be seen that it has the general appearance of a star comprising a central edge 11 and an exterior periphery 12. The central edge 11 is formed by a plurality of interior segments 111. The exterior periphery 12 comprises a plurality of exterior segments 121 forming arcs of circles contained on a circle circumscribed radially on the outside. The interior segments 111 of the central edge 11 comprise drillings to accept screws that form fixing elements for attachment to the rigid part of the wheel. The exterior periphery 12 is designed to collaborate with functional clearance J with respect to the said rim lateral part 251 (see FIG. 2).

In FIG. 1 it can be seen that the wheel base 20 resembles a conventional light-alloy wheel, but with a wheel disc offset that is nevertheless greater than usual. This is due to the fact that it is not a tyre that is mounted directly on the seats, but the adapters which the flexible rim lateral parts 251, 252 form. The offset is dimensioned so that the axially exterior faces of the spokes 26 are substantially coplanar with the axially exterior face of the flange 254.

Let us return to the hubcap 1. The exterior periphery 12 comprises a plurality of exterior segments 121 forming arcs of circles contained on the radially outside circumscribed circle. The exterior periphery 12 has a shape of revolution which, in the mounted position, is almost parallel to the rim lateral part 251 radially interior face axially on the outside, facing the flange 254 (see FIG. 3). The exterior segments 121 are extended axially inwards by tabs 123 (see FIG. 4). The tabs are deformable; they are long enough that in flexing they follow the radial movement imposed on the exterior periphery 12. The tabs 123 comprise drillings into which screws that form fixing elements for attachment to the rigid part of the wheel can be inserted.

The exterior segments 121 are connected to the central edge 11 by at least one deformable arm 122, namely in the example that FIG. 1 illustrates, by two deformable arms 122, arranged to flank the two substantially parallel lateral faces 261 of the spokes 26 of the wheel. Two arms 122 are connected to each exterior segment 121, on each side of each exterior segment in the circumferential direction. The tab 123 extends each segment via the axially interior edge thereof. The central edge 11 comprises interior segments 111 each connected to two deformable arms 122, the latter coming from different exterior segments 121, the said two arms 122 being connected to the exterior segment 121 that they connect on each side of the said interior segment in the circumferential direction.

Figure 2:
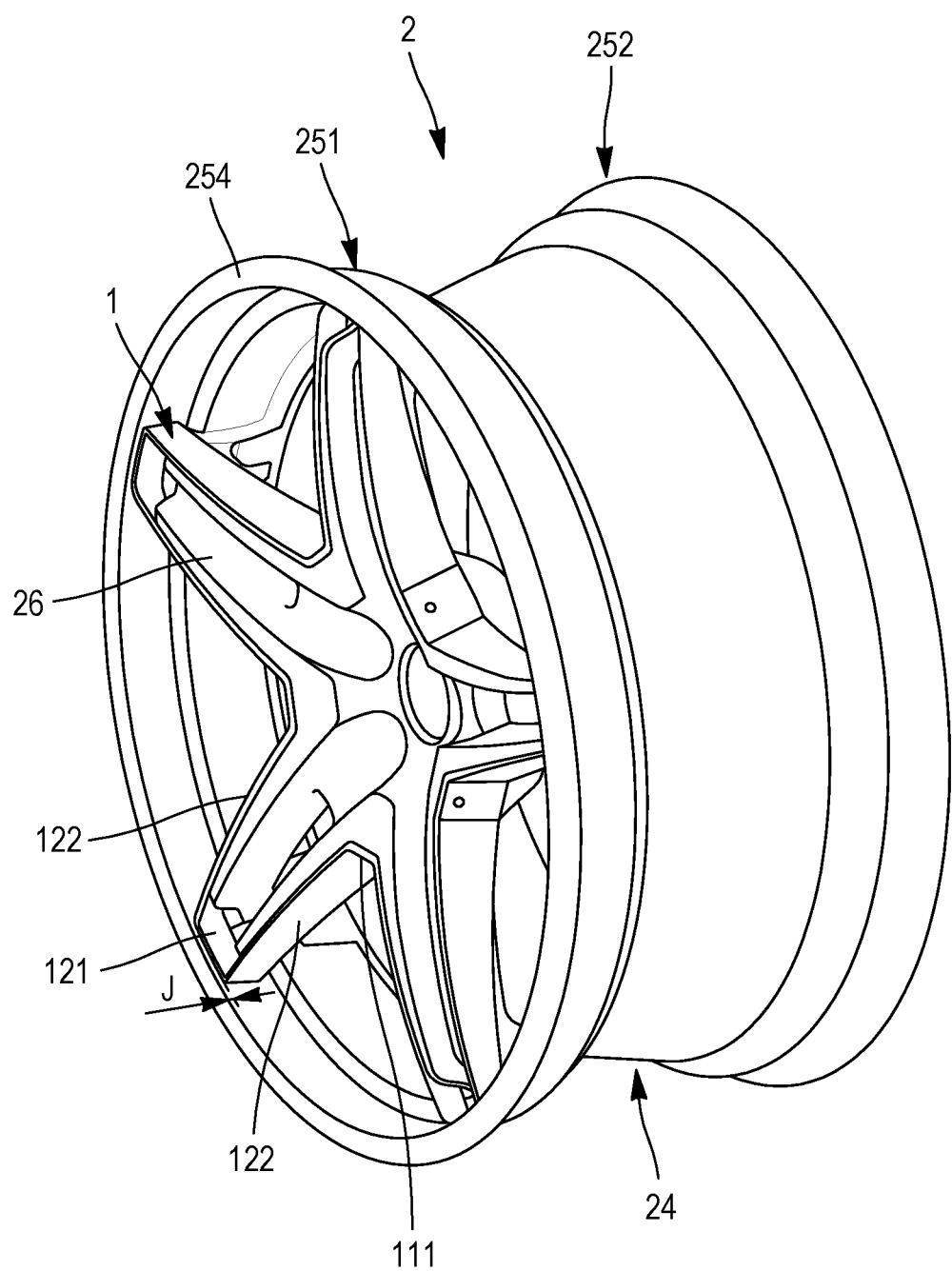
FIG. 2 is a perspective view showing an assembly formed by the components shown in FIG. 1, assembled to form an elastic-rim wheel and the hubcap thereof.
Figure 3:
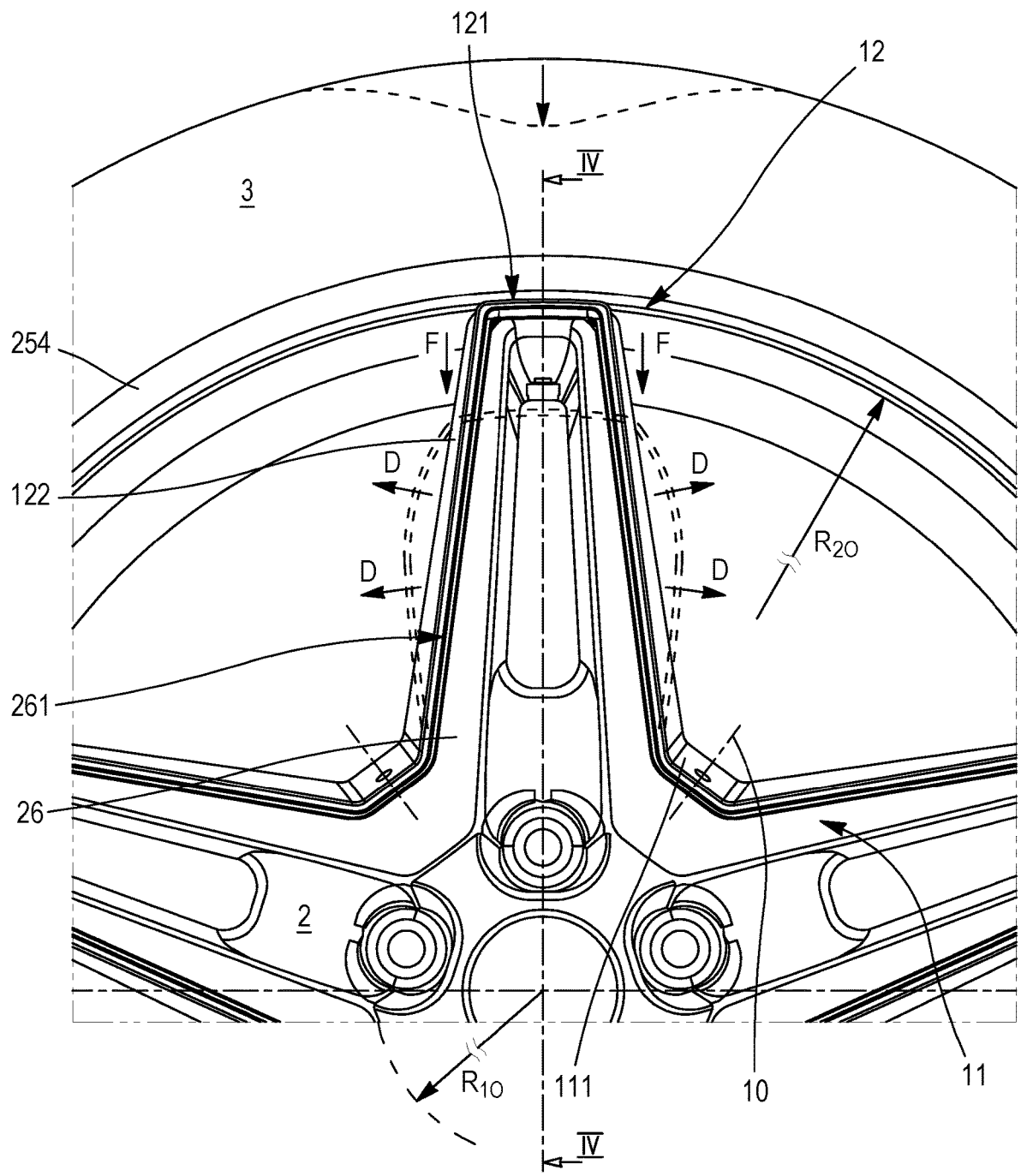
FIG. 3 is a side view, in the direction of the axis of rotation, partially showing the assembly of FIG. 2 on which a tyre is mounted.
Figure 4:
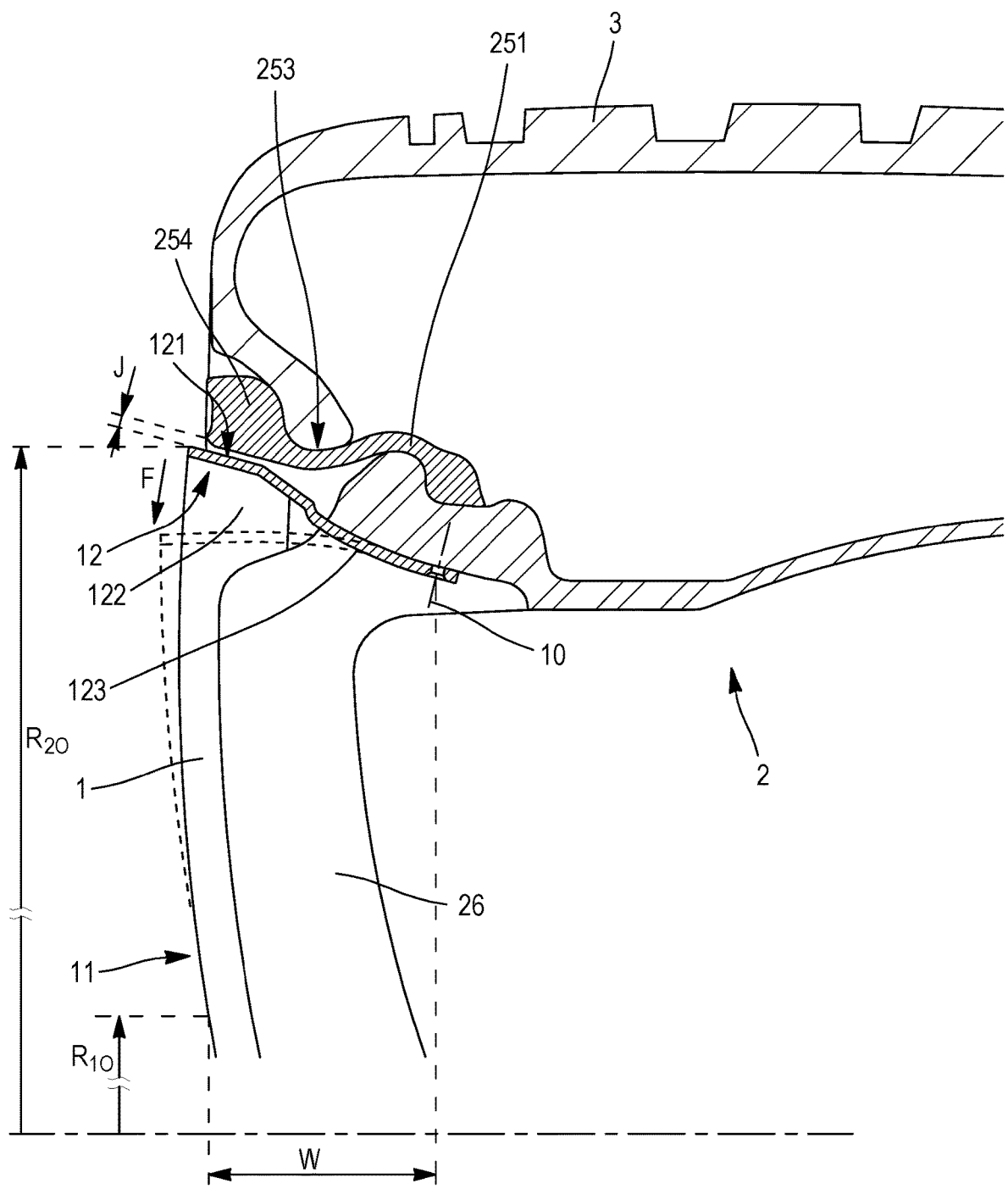
FIG. 4 is a radial section on IV-IV of FIG. 3.

FIGS. 3 and 4 show a tyre 3 mounted on a floating-seat wheel 2 fitted with its hubcap 1. The reader will recognise all the elements described hereinabove. Furthermore, in these figures, it can be seen that the central edge is situated at a radius $R_{10}$ and that the exterior periphery 12 is situated at a radius $R_{20}$. In this implementation, the hubcap 1 is in accordance with the following arrangement: the circle $R_{10}$ represents 30% of $R_{20}$. In the same figures, the hubcap is depicted in a continuous line in its undeformed state, the state in which it is depicted in FIGS. 1 and 2. It is also depicted in the deformed state, using broken line. It may be seen in particular that, if the tyre 3 strikes a significant obstacle, such as a kerbstone taken at significant speed, because the said rim lateral part 251 will flex radially inwards (in order not to overburden the drawings, the flexing of the rim lateral part is not depicted), the clearance J will immediately be used up and the said rim lateral part 251 will force at least one exterior segment 121 to experience a radially inwards deformation F, as depicted in broken line in FIGS. 3 and 4. The hubcap 1 is capable of absorbing this deformation through the buckling of the arms 122, as illustrated by the circumferential movement D visible in FIG. 3. By indicating that the arms 122 are deformable, it is meant that they are made from a material that allows them to be buckled without experiencing permanent deformation. Let it be pointed out that such deformation does not occur for each turn of the wheel under normal conditions, but only when the tyre experiences a significant impact, such as when exiting a pothole, and that, in such instances, only one sector of the wheel will experience deformation, which therefore normally represents one, or possibly two, pairs of arms 122.

Figure 5:
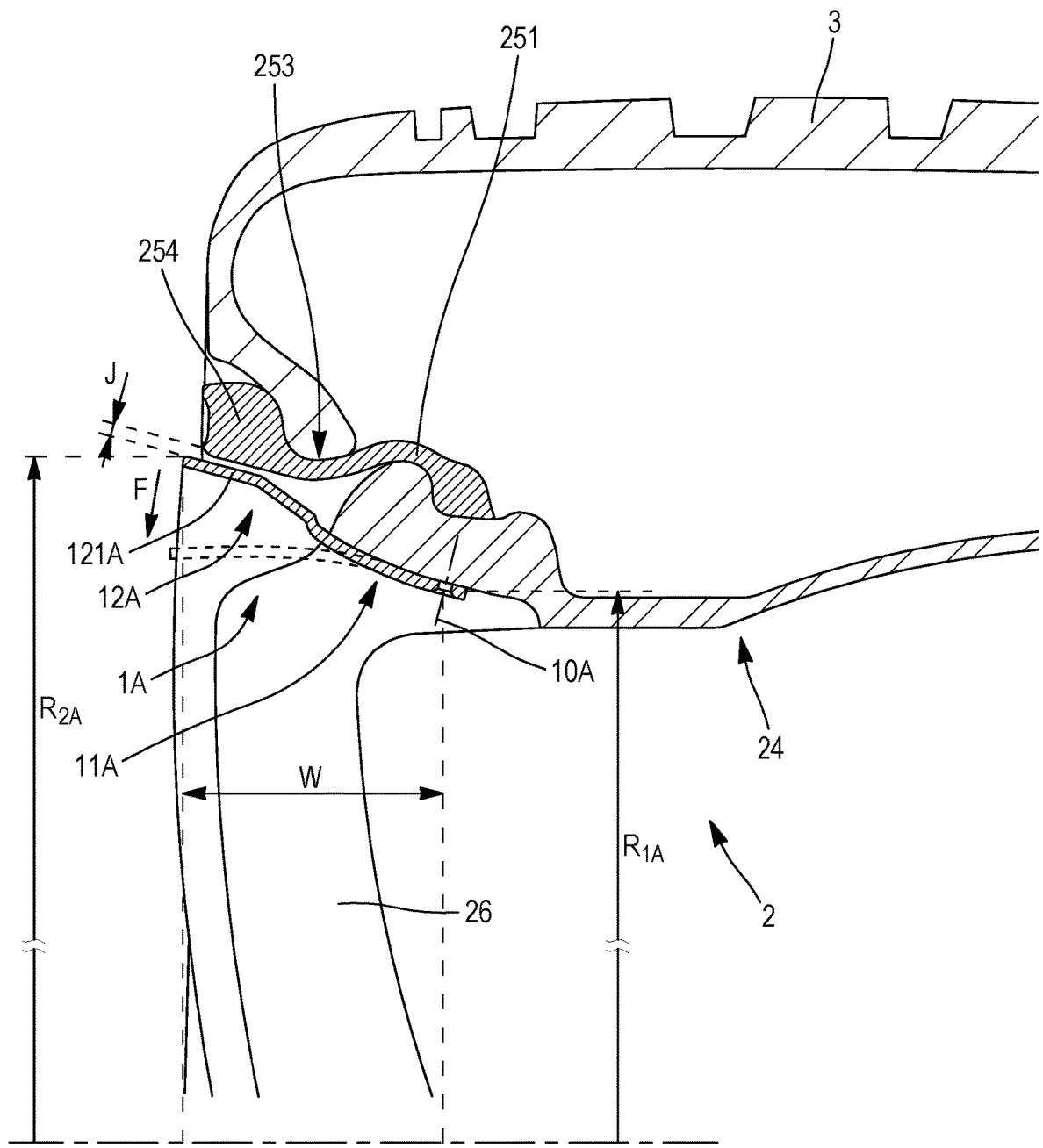
FIG. 5 is a radial section showing a first alternative form of embodiment of a hubcap according to the invention and, in part, a wheel with a floating tyre seat and a tyre.

FIG. 5 is a radial section showing a first alternative form of embodiment of a hubcap 1A with the overall appearance of a cone frustum, the outside diameter of which is similar to the tyre bead seat diameter, and the inside diameter of which is similar to the diameter of the central part of the rim. Parts which are similar bear the same numerical references, with the addition of the suffix "A", which means that there is no need to describe them again in full. The central edge 11A is radially fairly close to the exterior periphery 12A. The central edge 11A is interrupted in order to straddle the spokes 26. The hub 1A is intended to be fixed by screws 10A to the rigid part of the wheel 2 that forms the axially exterior edge on which a seat is formed for mounting the flexible lateral part 251. In this embodiment, the hubcap 1A is in accordance with the following arrangement: the exterior periphery 12A is axially distant from the closest 10A of the fixing elements for securing to the wheel by a value W representing 24% of $R_{2A}$. The exterior periphery 12A is designed to collaborate with functional clearance J with respect to the said rim lateral part 251. In the event of a high stress loading F that causes the exterior periphery 12A to move radially, the hubcap 1A adopts the appearance depicted in broken line. Let it be pointed out that the circle $R_{1A}$ represents 85% of $R_{2A}$.

Figure 6:
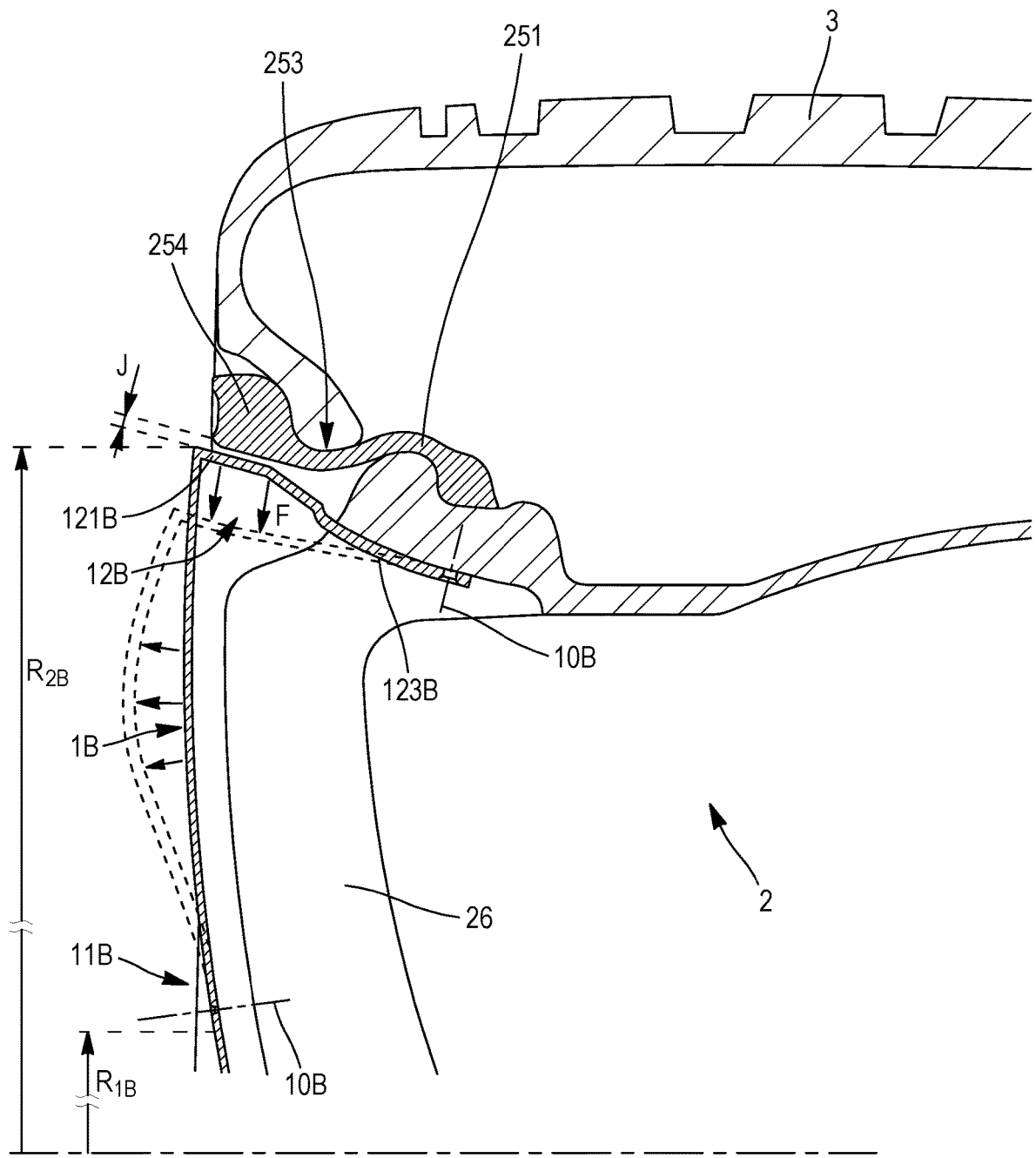
FIG. 6 is a radial section showing a second alternative form of embodiment of a hubcap according to the invention and, in part, a wheel with a floating tyre seat and a tyre.

FIG. 6 is a radial section showing a second alternative form of embodiment of a hubcap 1B of which the radially exterior part resembles the embodiment described in connection with FIGS. 1 to 4. Parts which are similar bear the same numerical references, with the addition of the suffix "B", which means that there is no need to describe them again in full. Each exterior segment 121B is connected, via its axially exterior edge, to an arm 122B positioned axially on the outside of the axially exterior face of each spoke 26. The radially interior end of all of the arms 122B forms the central edge 11B of the hubcap 1B, the arms 122B being deformable. The radially interior ends of the arms 122B form the central edge 11B of the hubcap 1B; they comprise drillings to accept screws 10B that form fixing elements for attachment to the rigid part of the wheel. It will be noted that, in this implementation, the hubcap 1B is likewise in accordance with the following arrangement: the circle $R_{1B}$ represents 33% of $R_{2B}$. The exterior periphery 12B is designed to collaborate with functional clearance J with respect to the said rim lateral part 251. In the event of a high stress loading F that causes the exterior periphery 12B to move radially, the hubcap 1B adopts the appearance depicted in broken line, with deformation of the tabs 123B and of the arms 122B, the latter through an axial movement R that is all the greater for the fact that this is mid-way along the radial height of the arms 122B (assuming these are made of isotropic material and have a constant cross section).

Figure 7:
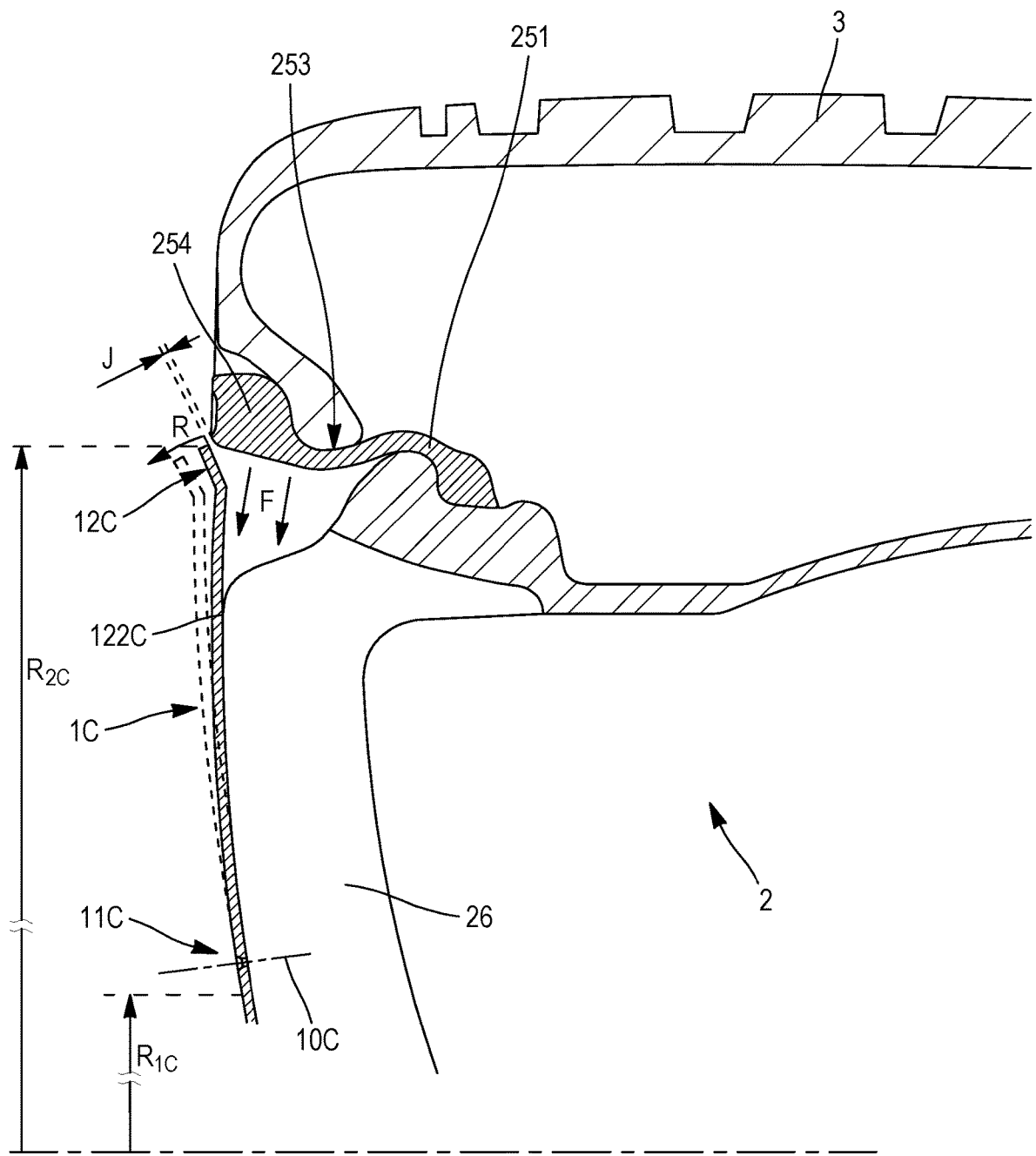
FIG. 7 is a radial section showing a third alternative form of embodiment of a hubcap according to the invention and, in part, a wheel with a floating tyre seat and a tyre.

FIG. 7 is a radial section showing a third alternative form of embodiment of a hubcap 1C. The latter may adopt the appearance of a disc, which may or may not have a hole in the middle; it may also adopt the appearance of a collection of arms 122C similar to the arms 122B. Parts which are similar bear the same numerical references, with the addition of the suffix "C", which means that there is no need to describe them again in full. The radially interior end of the collection of arms 122C (or of the disc) forms the central edge 11C of the hubcap 1C. The arms 122C are deformable (or the disc is deformable). The central edge 11C comprises drillings to accept screws 10C that form fixing elements for attachment to the rigid part of the wheel. It will be noted once again that, in this implementation, the hubcap 1C is likewise in accordance with the following arrangement: the circle $R_{1C}$ represents 30% of $R_{2C}$. Let it be noted that, depending on the size of the wheel, and choice of materials, a suitable range of values for $R_{1C}$ is from 30% to 65% of $R_{2C}$. The exterior periphery 12C (which may or may not be circumferentially continuous) is designed so that, in the relaxed state free of any stress, with the hubcap 1C mounted on the wheel 2, it is slightly axially offset with respect to the flange 254, with functional clearance J. In the event of a high stress loading F that causes the flange 254 to move radially, the exterior periphery 12C is pushed axially outwards and adopts the appearance depicted in broken line, with deformation of the arms 122C (or of the disc in the case of a solid disc).

Figure 8:
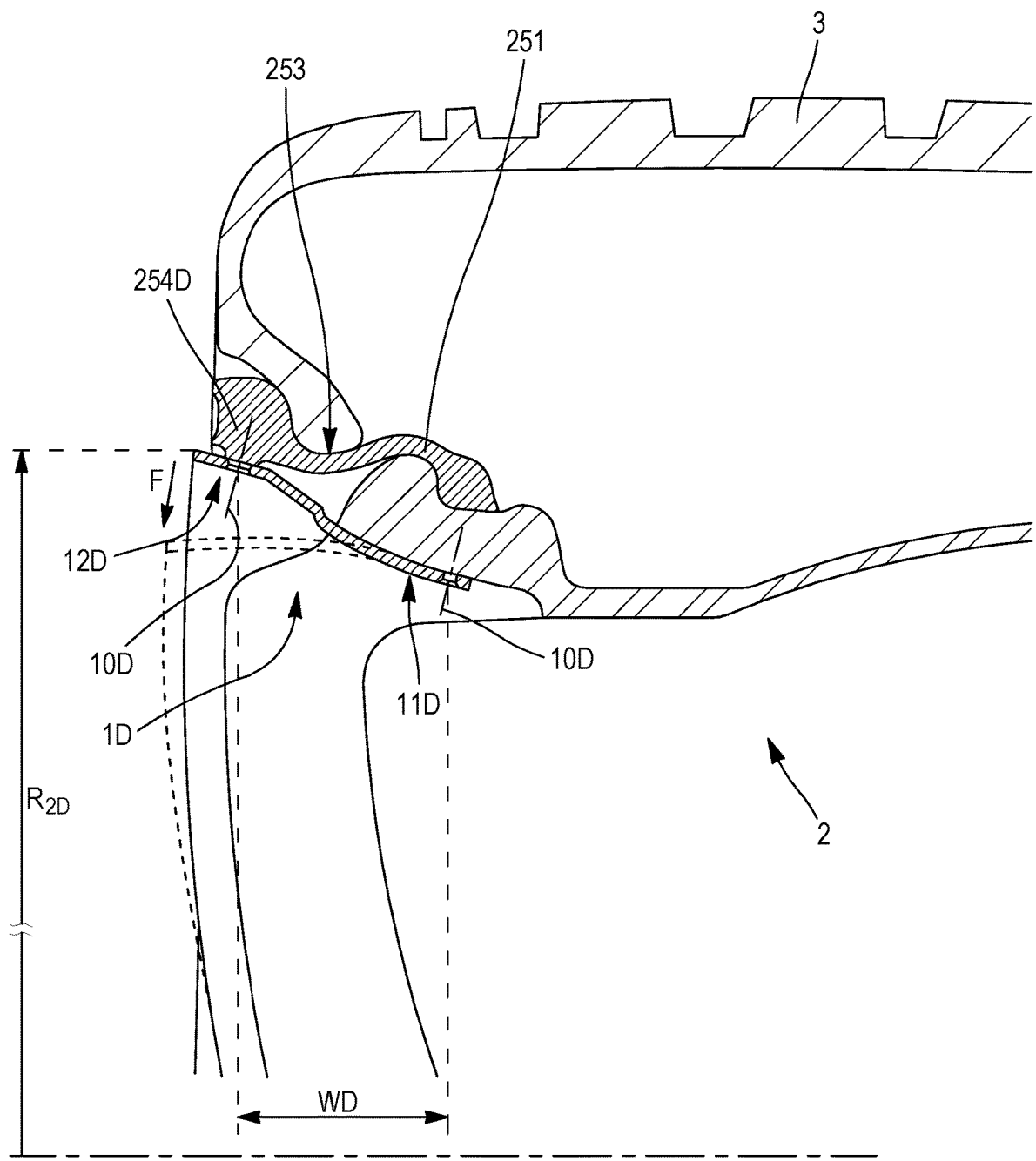
FIG. 8 is a radial section showing a fourth alternative form of embodiment of a hubcap according to the invention and, in part, a wheel with a floating tyre seat and a tyre.

FIG. 8 is a radial section showing a fourth alternative form of embodiment of a hubcap 1D according to the invention, in which the exterior periphery 12D of the hubcap 1D comprises fixing elements 10D, for example screws, for attaching to the floating part of the wheel, namely to the flange 254D, which comprises a corresponding female threaded part or any equivalent arrangement, depending on the fixing means used. Parts which are similar bear the same numerical references, with the addition of the suffix "D", which means that there is no need to describe them again in full. In this implementation, the hubcap 1D is in accordance with the following arrangement: the exterior periphery 12D is axially distant from the closest 10D of the fixing elements for securing to the wheel by a value WD representing 24% of $R_{2D}$, WD being measured between the positive fixing points on the one hand on the rigid part of the wheel and on the other on the floating part of the wheel because that is what is important from a functional standpoint in order to allow the elastic deformations. The other elements are comparable to what has been described hereinabove (references to parts which are similar or identical being referred to in the drawings by the same numerals, this time bearing the suffix "D", and not requiring additional explanation.

The invention lends itself to numerous variations; it opens the way to a new design for the use of floating-rim wheels; among the possible and beneficial variations let us mention the possibility of incorporating into the hubcap according to the invention an indicator that an impact has been suffered that is above and beyond a certain threshold, which will, for example, result in visible permanent deformation of part of the hubcap or in local breakage or loss thereof.

Finally, let it also be pointed out that the invention extends to an assembly comprising a hubcap 1, 1A, 1B, 1C, 1D, 1E according to the invention and a floating-seat wheel 2.

The invention claimed is:

1. A hubcap for a wheel, the hubcap comprising: a central edge comprising fixing elements for securing to a wheel, which are arranged inside a circle of radius R1; and an exterior periphery inscribed on a circle of radius R2, wherein the exterior periphery is designed to collaborate with functional clearance J with respect to a rim lateral part, wherein the exterior periphery comprises a plurality of exterior segments forming arcs of circles contained on a circle circumscribed radially on the outside, the exterior segments having a shape of revolution which, in a mounted position, is almost parallel to the rim lateral part with a radially interior face disposed, in part, axially outside of the wheel, facing a flange, wherein the exterior segments are able to move radially, wherein the exterior segments are extended axially inwards by deformable tabs, the tabs comprising tab fixing elements for attachment to a rigid part of the wheel, and wherein the rigid part of the wheel comprises a plurality of spokes connecting a rigid central part and a rigid peripheral part, each spoke having two lateral faces which are substantially parallel to one another and substantially parallel to a plane containing an axis of rotation of the wheel, in which:

the exterior segments are connected to the central edge by two deformable arms arranged to flank the two lateral faces, the two deformable arms being connected to the exterior segment that they connect on each side of the exterior segment in the circumferential direction, one of the tabs extending the exterior segment via the axially interior edge thereof, and the central edge comprises interior segments each connected to two deformable arms, each of the two deformable arms coming from different exterior segments, the two deformable arms being connected to the exterior segment that they connect on each side of the said interior segment in the circumferential direction, and wherein the central edge and the exterior periphery are in accordance with at least one of the arrangements selected from:

an edge of the exterior periphery is axially distant from the closest of the tab fixing elements by a value exceeding 10% of R2, and the circle R1 represents at most 90% of R2.

2. The hubcap according to claim 1, wherein the exterior periphery comprises fixing elements for attaching to a floating part of the wheel.

3. The hubcap according to claim 2, wherein the fixing elements for attaching to the floating part of the wheel provide attachment to a flange.

4. The hubcap according to claim 1, wherein the fixing elements of the central edge and the tab fixing elements are screws.

5. The hubcap according to claim 1, wherein the circle R1 represents at most 75% of R2.

6. The hubcap according to claim 5, wherein the circle R1 represents at most 45% of R2.

* * * * *